Figure 1:
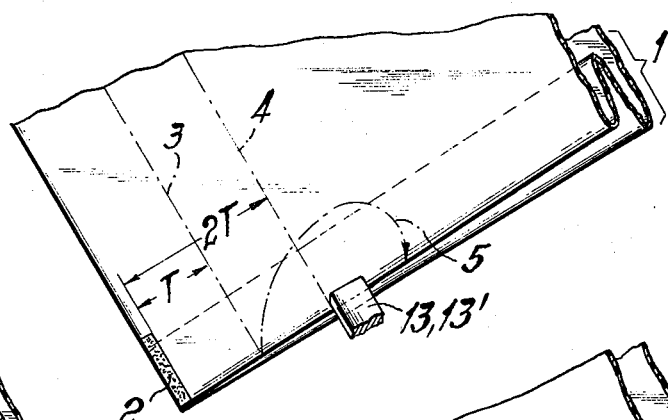

United States Patent [19]
Brinkmeier

[11] 3,896,709
[45] July 29, 1975

[54] PROCESS AND APPARATUS FOR MANUFACTURING BLOCK BOTTOM BAGS FROM HEAT-SEALABLE MATERIAL

[75] Inventor: Friedhelm Brinkmeier, Ladbergen, Germany

[73] Assignee: Windmoller & Holscher, Lengerich, Germany

[22] Filed: Nov. 14, 1973

[21] Appl. No.: 415,514

[30] Foreign Application Priority Data
Nov. 14, 1972 Germany............................ 2255768

[52] U.S. Cl................ 93/35 SB; 93/DIG. 1; 93/8 R; 93/27; 93/33
[51] Int. Cl............................................. B31b 31/26
[58] Field of Search ... 93/35 SB, 35 R, 8 R, DIG. 1, 93/33 H, 33 R, 14, 17, 18, 21–27

[56] References Cited
UNITED STATES PATENTS
| | | | |
|---|---|---|---|
| 2,088,228 | 7/1937 | Belcher et al...................... | 93/8 R X |
| 2,648,263 | 8/1953 | Richens........................... | 93/DIG. 1 |
| 3,094,905 | 6/1963 | Haslacher......................... | 93/35 SB |
| 3,606,822 | 9/1971 | Platz et al. ....................... | 93/35 SB |

*Primary Examiner*—Roy Lake
*Assistant Examiner*—James F. Coan
*Attorney, Agent, or Firm*—Fleit & Jacobson

[57] ABSTRACT

A bag having side gussets and a simple but incomplete bottom seam weld is made first from a tube having side gussets. The side gussets are then spread and the bag is pulled open at its bottom, whereafter the pulled-open wall portions are backfolded and flattened to form the bag with a block bottom, which is then sealed. At least the side gusset portions of the tube section are fixed to each other adjacent to the seam by the incomplete bottom seam weld formed first. When the bottom portion has been pulled open and has then been flattened to form a block bottom, the bottom seam edge strips which protrude substantially at right angles from the plane of the rectangular bottom are introduced into an open welding clamp and the incomplete seam is closed completely by welding.

2 Claims, 11 Drawing Figures

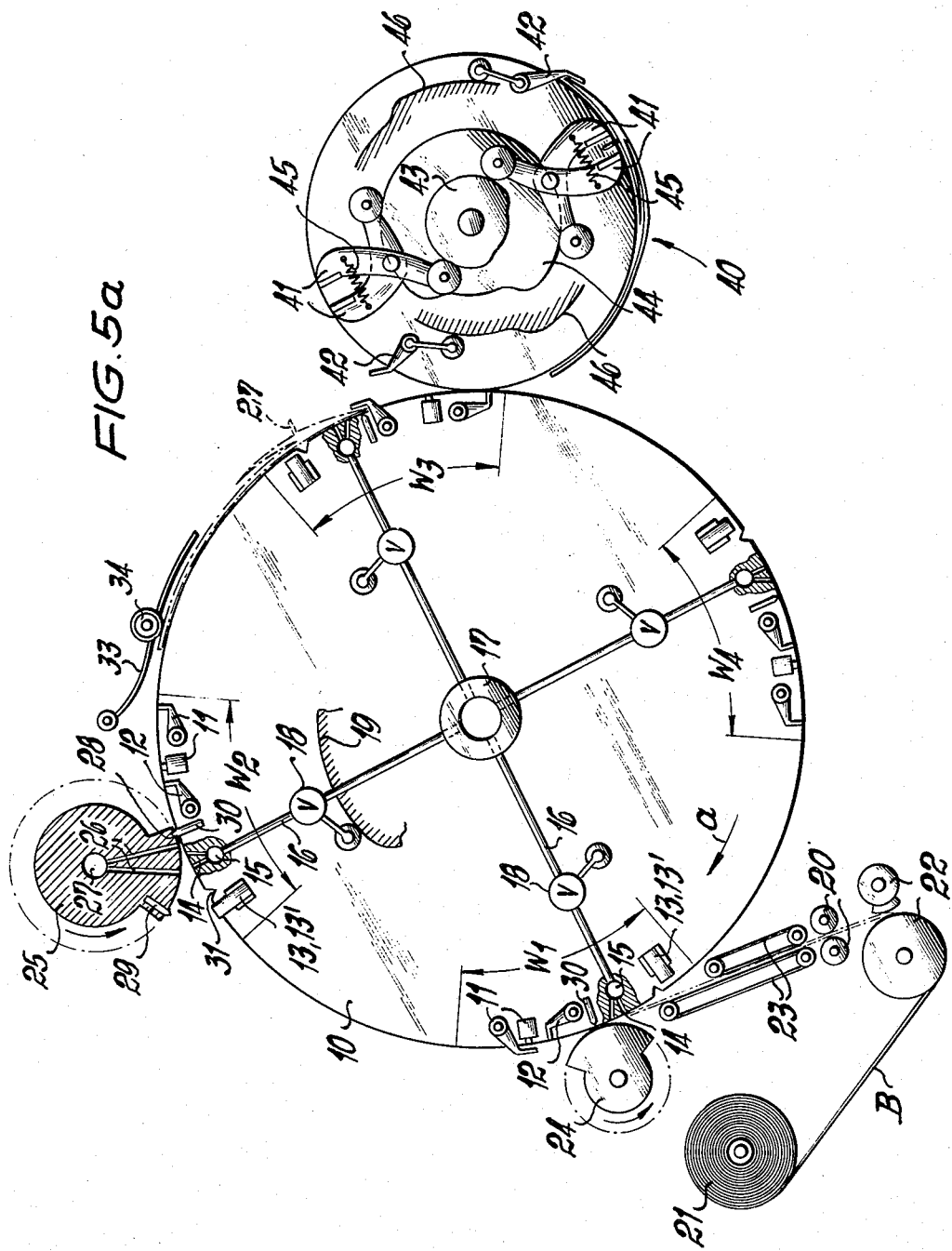

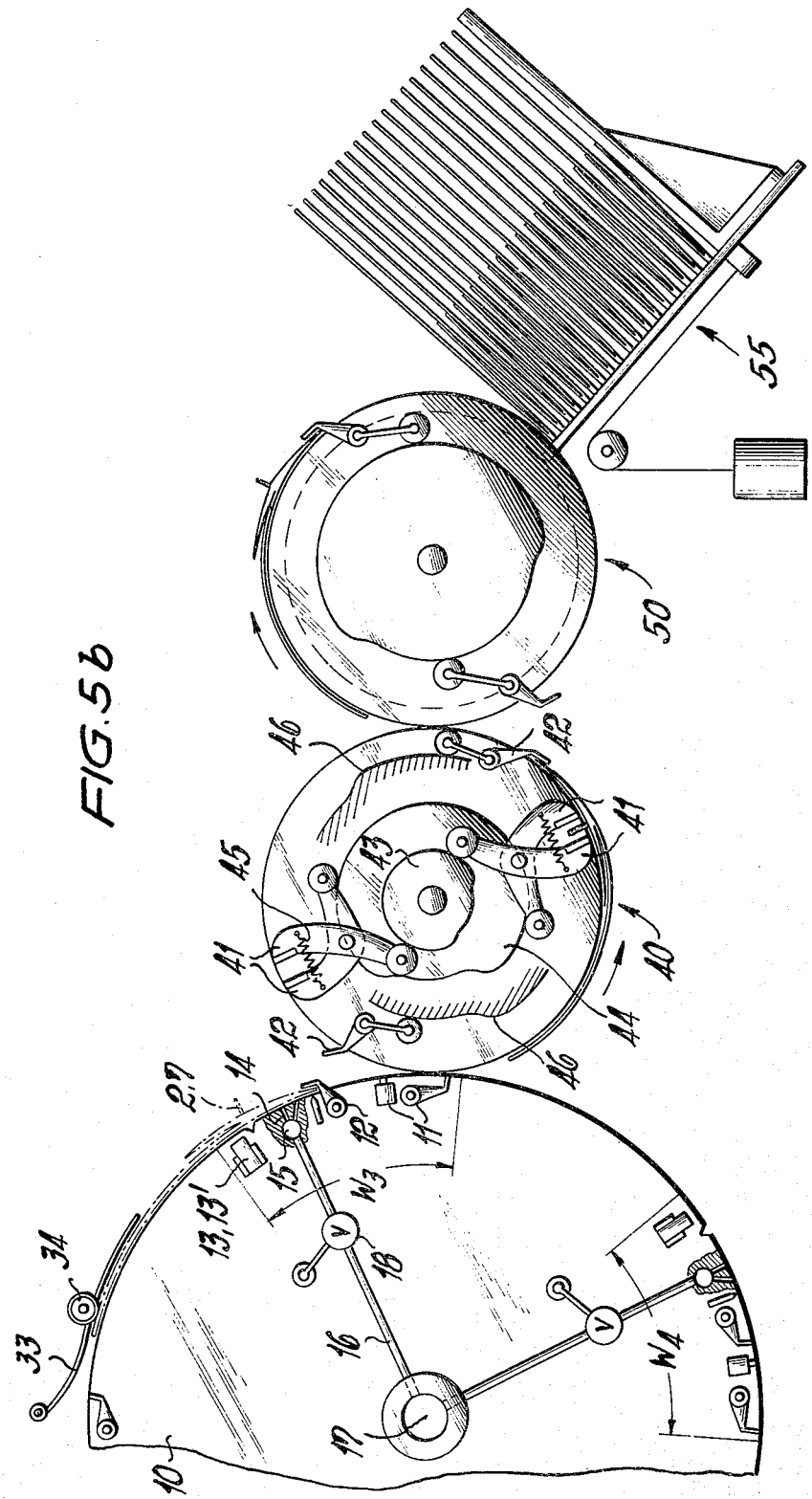

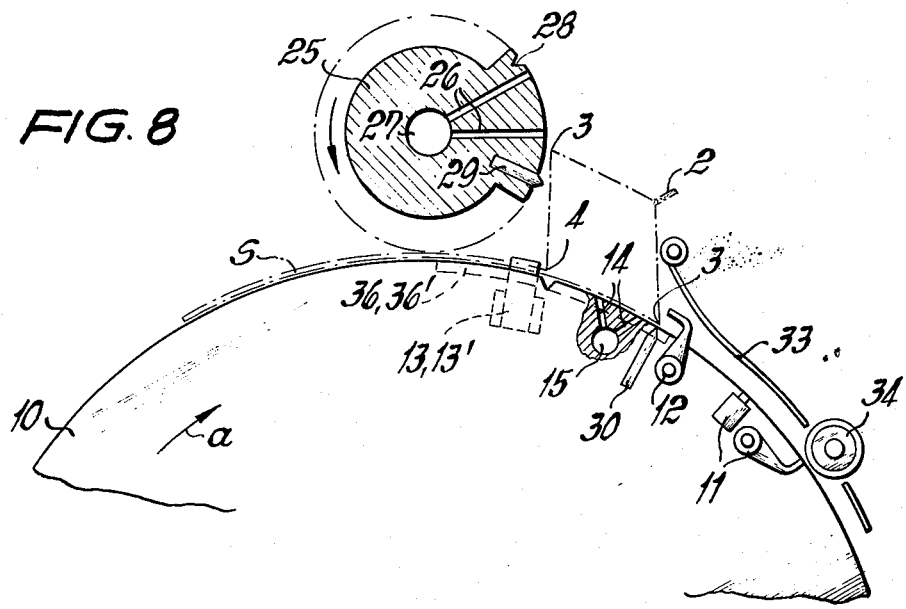
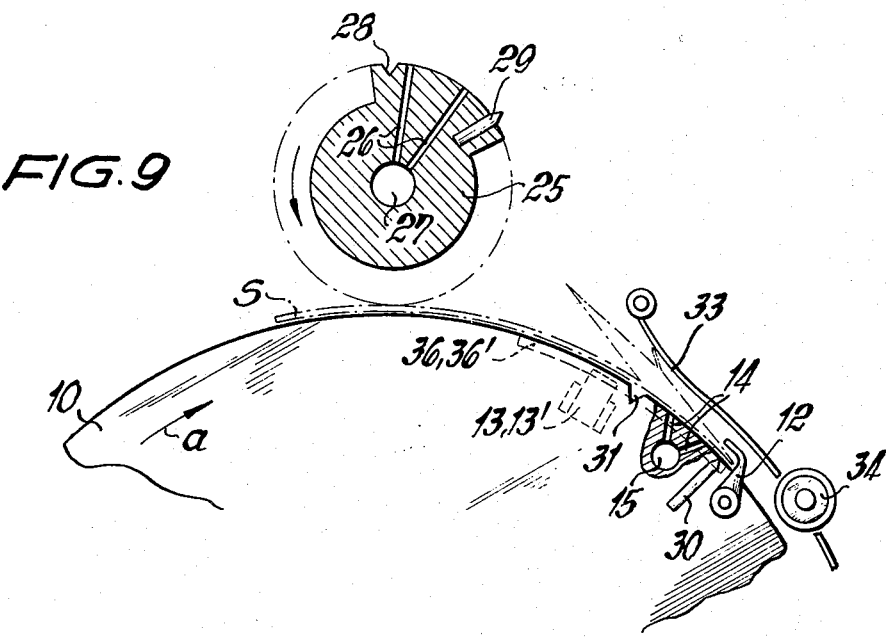

PROCESS AND APPARATUS FOR MANUFACTURING BLOCK BOTTOM BAGS FROM HEAT-SEALABLE MATERIAL

This invention relates to a process of manufacturing block bottom bags from heat-sealable material, in which process a bag having side gussets and a simple but incomplete bottom seam weld is made first from a tubing having side gussets, the side gussets are then spread and the bag is pulled open at its bottom, whereafter the pulled-open wall portions are backfolded and flattened to form the bag with a block bottom, which is then sealed.

In that process, which has been proposed before by the applicants, tube sections having side gussets are formed with incomplete bottom seam welds between the side gussets in such a manner that the side gussets remain unwelded. When the bottom is pulled open and subsequently flattened, the side gussets are urged outwardly to form triangular bottom flaps, which protrude beyond the width of the tube having side gussets. These bottom flaps hanging out on both sides must be coated with adhesive on their upper surface, then dried, backfolded and adhered to the bottom, and the resulting rectangular bottom must then be sealed by a bottom patch.

These operations require a complicated apparatus for the manufacture of the bags because the sheeting of plastics material must be treated by a corona discharge and the application of adhesive for joining plastics material requires encased applicating means which are provided with vapor vents and must be serviced, as well as paths of travel on which the adhesive is dried. Besides, that method of forming the bottom requires an adhered bottom patch, for which the means just described must be provided too. As a result, the machine as well as the bags made thereon are expensive and complicated. However, the quantity of sheeting required is increased by the bottom patch so that the cost of the bags is further increased. In spite of its expensive manufacture, the bag is not completely tight because the plastics material cannot form sharp folds but forms small passages at the score lines.

In another known process, which is similar to the one defined first hereinbefore and disclosed in the German Patent Specification No. 830,157, a block bottom bag is made from a paper tube having side gussets. In that process, the bottom is first closed by a sewn seam and is then formed into a block bottom in that the side gussets are pulled open and subsequently flattened adjacent to the bottom. That process cannot be applied to bags of plastics material for the following reasons: It is a disadvantage of the known process that the pulling open of the side-gusseted bag adjacent to its bottom to form the block bottom results in the formation of a large cavity, as in opening bellows, and this cavity must be filled with air, which can enter the cavity only through the filling opening and must flow in the flattened side-gusseted bag throughout the length thereof. Because the side-gusseted bag is flattened, it presents a high resistance to the flow of air. The suction exerted by the cavity which forms adjacent to the bottom increases the flatness of the bag and its resistance to flow. The faster the cavity opens, the higher will be the resistance to flow. For this reason the number of block bottom bags which can be made per unit of time in this way is limited and depends primarily on the stiffness of the bag material and the resulting deviation of the bag from an exactly flat position. The higher the flexibility of the material used to make the bag, the lower is the number of bags which can be made per unit of time. Specifically, side-gusseted bags of plastics material sheeting can be formed into block bottom bags only at a low rate by the above-mentioned known process because the material is highly flexible. On the other hand, plastics material sheeting can be adhesively joined only with difficulty so that it is particularly desirable in this case first to make a side-gusseted bag having a simple bottom seam weld and then to transform said bag into a block bottom bag.

It is an object of the invention so to improve the process defined first hereinbefore that the prepared bag can be processed further by welding to form a perfectly tight bag without adhesive joints and without need for additional materials. This object is accomplished according to the invention in that at least the side gusset portions of the tube section are fixed to each other adjacent to the seam by the incomplete bottom seam weld formed first, and when the bottom portions has been pulled open and has then been flattened to form a block bottom, the bottom seam edge strips which protrude substantially at right angles from the plane of the rectangular bottom are introduced into an open welding clamp and the incomplete seam is closed completely be welding.

Because the plies are fixed at the gussets, the rectangular block bottom is formed in that the bottom is pulled open and flattened and the block bottom thus formed need not be transformed thereafter. Because the seam weld is interrupted, a flow passage which is large in cross-section is provided in the central area for the air which enters as the bottom is pulled open and which escapes as the bottom is flattened. This enables the manufacture of bags in a large number per unit of time. The seam-welded hems at the side gussets protrude substantially at right angles from the plane of the rectangular bottom and ensure that even the edge strip portions in the central area which are not yet welded are held in a position in which they protrude at right angles so that they can easily be introduced into a welding clamp.

The invention provides also an apparatus for carrying out the process according to the invention. This apparatus is developed from an apparatus used according to the prior proposal of the applicants and comprising means for continuously feeding a plastics material tubing and for severing individual tube sections, means for forming the tube sections with transverse score lines which are spaced from the leading opening edge by one half of the bottom width and by the bottom width, respectively, a continuously rotating tool carrier, which receives and advances the tube sections while they travel in their longitudinal direction and which carries tool groups which are spaced regular distances apart, which are at least as large as the length of the longest tube section to be processed, each of said groups comprising the following tools: a welding tool for forming the incomplete transverse seam weld at the leading opening of the tube section, a row of grippers, which extends transversely to the direction of travel and is spaced behind the welding tool by one-half of the bottom width, a pair of lateral grippers for gripping the longitudinal edges of the tube section on a line which is spaced by the bottom width behind the welding tool, and a number of suction bores, which become effective in the region between the row of grippers which is parallel to the axis and the pair of lateral grippers, said apparatus further comprising a suction segment, which revolves in rolling contact with the tool carrier at the same peripheral velocity as the tool carrier and is operatively connected to the tool carrier to cooperate with the suction bores formed in the tool carrier.

For carrying out the process according to the invention, the above-mentioned apparatus is provided with a welding device, which revolves at the same peripheral velocity as the tool carrier and receives and forwards the workpieces as they travel in their longitudinal direction, said welding device comprises at least one welding clamp, which is adapted to be opened and closed during each revolution, and the welding device is operatively connected to the tool carrier in such a manner that a welding clamp closes and moves past the point of contact between the tool carrier and the welding device as bottom seam edge strips protruding at right angles move past as bottom seam edge strips protruding at right angles move past said point of contact.

An embodiment of the invention will be described more fully and by way of example with reference to the accompanying drawings, in which FIGS. 1 to 4 illustrate four phases of the manufacture of a block bottom bag by the process according to the invention, FIGS. 5a and 5b combined are diagrammatic side elevations showing a machine for manufacturing the block bottom bags by the process according to the invention, and FIGS. 6 to 9 are side elevations showing on an enlarged scale the bottom-laying device of FIG. 5 in four different operating positions.

Figure 1A:
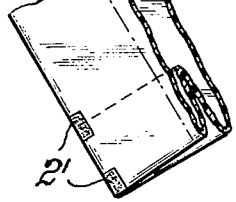
Figure 2:
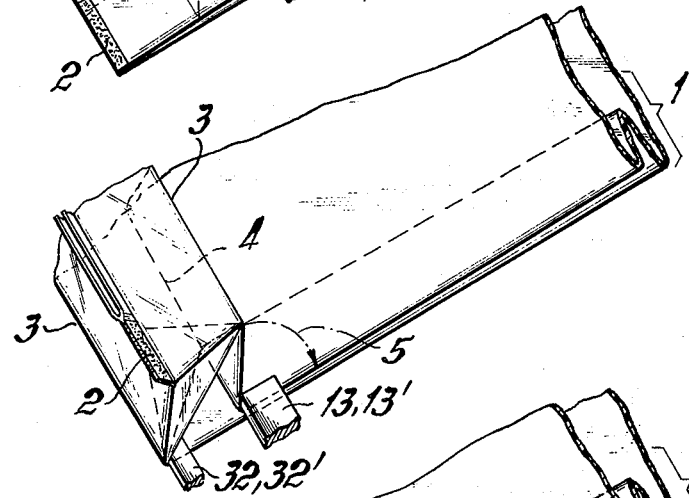
Figure 3:
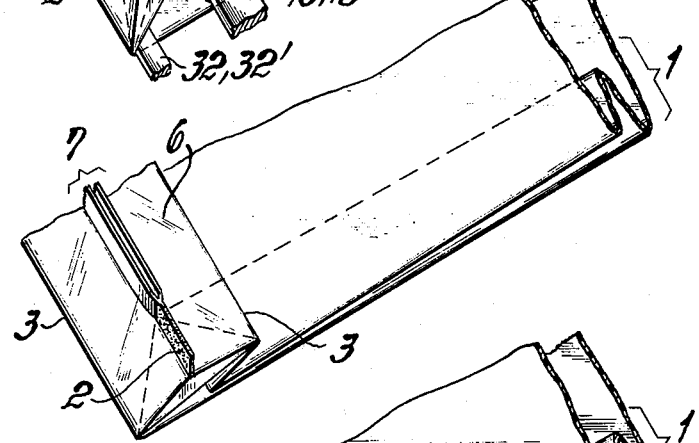
Figure 4:
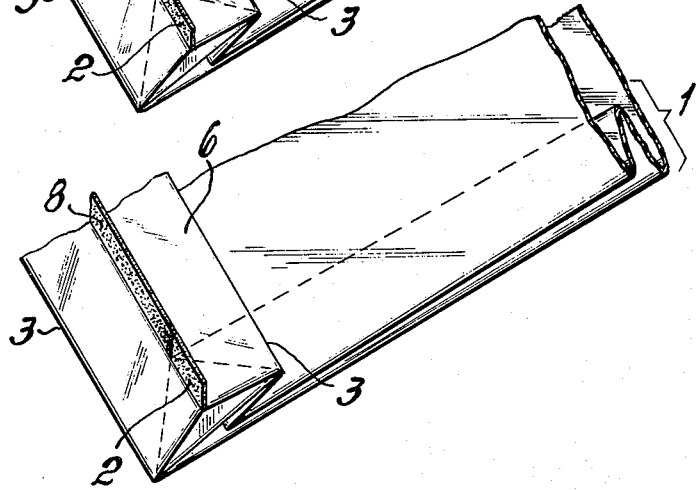

In the manufacturing process according to the invention which is illustrated in FIGS. 1 to 4 showing four different phases of the manufacture of block bottom bags, a tube section cut from a tubing having side gussets which have the depth T is provided at its bottom end on both sides with short seam welds 2 at the gussets 1 so that the plies are fixed to each other at that end in that region. As is shown in FIG. 1a it would be sufficient to fix the side gussets to each other by some spot welds 2' in that region. To facilitate an exact pulling-open of the rectangular block bottom, score lines 3 and 4 are provided which are respectively spaced from that edge of the seam weld which faces the interior of the bag by once and twice the side gusset depth T. The bottom is then opened by a movement which is indicated by a dash-dot semicircle 5. The bottom is shown in an intermediate stage of this movement in FIG. 2. This movement results in the formation of a substantially prismatic, bellows-like cavity. The bottom is subsequently flattened (FIG. 3) to form a rectangular block bottom 6. A short flow path which is sufficiently large in cross-section is available for the air which is sucked into the cavity as it increases in size when the tube section end is pulled open and for the air which is expelled when the tube section end is flattened during the formation of the bottom. This flow path is defined by the seam edge strips 7, which do not close when air is sucked through the cavity. The edge strips of the incomplete bottom seam protrude substantially at right angles to the plane of the flattened bottom 6 so that the edge strips can easily be introduced into a welding clamp in which the bottom seam is completed at said edge strips (seam weld 8).

FIGS. 5 to 9 show an illustrative embodiment of a bottom-laying device which may be used in carrying out the described process. The bottom-laying device comprises a feeding drum 10, which continuous revolves in the direction of travel and has a width which is at least as wide as the tube sections to be processed. This drum carries identical tool groups $W_1$, $W_2$, $W_3$, and $W_4$ which are regularly spaced by distances which are at least as large as the lengths of the longest tube section.

Each of these tool groups consists of an electrically heated welding clamp 11 for forming the transverse seam weld 2 at the gussets at the leading end of the tube section, a row of grippers 12, which extends transversely to the periphery of the drum and in the direction of travel succeeds the welding clamp 11 and is spaced therefrom by one-half of the bottom width, which equals the gusset depth T, a pair of grippers 13, 13', which are provided at the ends of the feeding drum and adjacent to the longitudinal edges of the tube section and succeed the welding clamp 11 and are spaced therefrom by twice the gusset depth T, which equals the bottom width, and a plurality of rows of suction bores 14, which open at the periphery of the feeding drum between the row of grippers 12 and the pair of grippers 13, 13'. The suction bores 14 are connected to a vacuum source by a transverse bore 15, a radial pipe 16 and the hollow shaft 17 of the feeding drum. The suction action of the suction bores is controlled by a control valve 18, which is operated by a stationary cam 19. The welding clamp 11 and the grippers 12, 13, 13' are also operated in known manner by stationary cams, which are not shown on the drawing for the sake of clarity.

The feeding drum 10 is preceded by a pair of feeding rollers 20 for withdrawing the tubing B from a supply roll 21, a perforator 22 for forming the tubing with transverse perforation lines which are spaced apart by the desired length of the tube sections, and a double belt conveyor 23 for tangentially feeding the tubing to the periphery of the feeding drum adjacent to the bottom of a tear-off segment 24, which is in rolling contact with said periphery. The velocity imparted to the tubing by the feed rollers 20 is less than the peripheral velocity of the feeding drum. The tear-off segment is coupled to the feeding drum in such angular relation thereto that the segment begins to contact the periphery of the feeding drum shortly behind the welding clamp 11 of each tool group.

In the direction of travel a, the tear-off segment 24 is succeeded by a suction segment 25, which is associated with the feeding drum 10 and driven at the same peripheral velocity as the tear-off segment. The suction segment 25 is coupled to the feeding drum to roll on those portions of the periphery of the feeding drum which are disposed between the row of grippers 12 and the pair of grippers 13, 13' and are provided with suction bores 14. The suction segment has approximately the same width as the feeding drum and is provided with one or more suction bores 26, which open at the periphery of the suction segment and which through the bore 27 in the shaft of the suction segment and a control valve, not shown, can communicate with a vacuum source. Just as the previously described control valves 18, the control valve may be controlled by stationary cams. The suction segment is provided on its periphery with a scoring groove 28 near its leading edge and with a scoring knife 29, which is spaced from the scoring groove by one-half of the bottom width. The feeding drum 10 is provided on its periphery with a scoring knife 30 and a scoring groove 31, which are respectively associated with the scoring groove 28 and the scoring knife 29. These scoring tools extend throughout the width of the feeding drum and of the suction segment, respectively, and serve to form transverse score lines 3 and 4 in the tube section (see FIGS. 1 and 2).

Besides, it is recommended to provide another pair of lateral grippers, which are spaced behind the welding clamp 11 by one-half the bottom width and which grip the lower half of each gusset of the tube section immediately behind the scoring knife 30 at its longitudinal edge and retain them on the feeding drum. Those side faces of that pair of grippers which face in the direction of travel $a$ have an inclination of 45° to the direction of travel. The grippers of this pair might also be operated in known manner by stationary cams.

In the direction of travel, the suction segment 25 is succeeded by a stationary folding plate 33, which extends throughout the width of the feeding drum and in the direction of travel $a$ continuously approaches the periphery of the feeding drum and then extends around and is slightly spaced from the periphery of the drum. The folding plate defines a gap, in which a pressure roller 34 is disposed, which extends throughout the width of the feeding drum and rolls on the periphery of the latter.

The tubing B is fed by the pair of feed rollers 20 at a velocity which is lower than the peripheral velocity of the feeding drum 10 and in the perforator 22 is provided with transverse perforation lines which extend throughout the width of the tubing and are uniformly spaced apart by distances corresponding to the desired length of each tubing section. Leaving the double belt conveyor 23, the leading edge of the tubing enters the gripping range of one of the welding clamps 11 which are provided on the periphery of the feeding drum 10. This welding clamp grips said leading edge and thus forms the seam weld 2. Immediately behind the welding clamp 11, the tear-off segment 24 begins to contact the tubing and advances the same at the higher velocity of the feeding drum so that the gripped tube section is torn from the tubing along the transverse perforation line. The pair of grippers 13, 13' are now closed to retain the tubing S on the feeding drum whereas the welding clamp 11 forms the seam weld 2 while the tube section travels to the suction segment 25. The welding clamp 11 opens shortly before the tube section arrives at the suction segment.

The operation by which the leading end of the tubing section which has partly been closed by the transverse seam weld 2 is shown in four typical phases in FIGS. 6 to 9.

Figure 6:
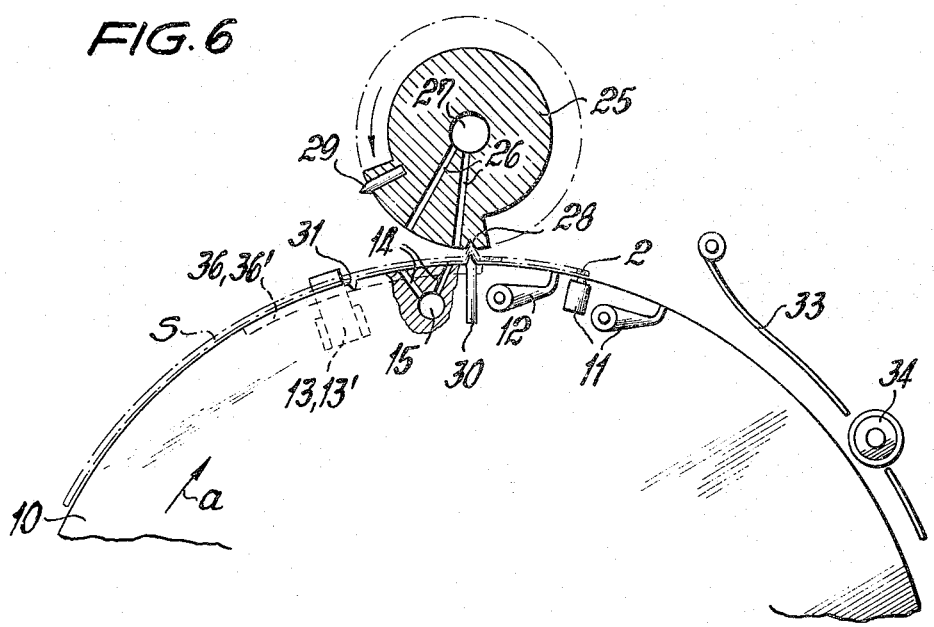
Figure 7:
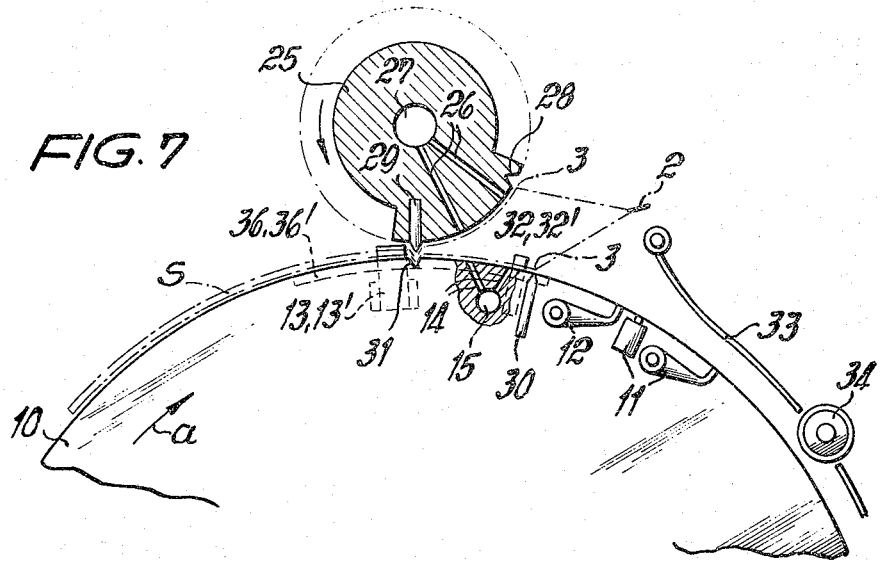

As the tube section S travels under the suction segment 25, the transverse score line 3 (FIG. 1) extending across the width of the tube section is formed by the scoring tools 28, 30. This is shown in FIG. 6. In accordance with FIG. 7, the tube section is then pulled open under the action of the suction bores 14, 26 in the area between the transverse score line 3 and the pair of grippers 13, 13' and by means of the scoring tools 29, 31 is provided with the transverse score line 4 (FIG. 1). Because the leading end of the tube section has partly been closed by the seam weld 2, as described, a strip at said leading end in the width of the seam weld rises into the range of the folding plate 33 and assumes the shape of a parallelogram in cross-section. This is shown in FIG. 7. Shortly after the pulling-open begins, the pair of grippers 32, 32' (FIG. 7) open to grip the lower half of the side gussets at the longitudinal edge thereof (see also FIG. 2). When the suction segment 25 is in the position shown in FIG. 7, the suction action of said segment is interrupted. The tube section released by the suction segment is then moved under the folding plate 33 and its pulled-open end is backfolded on the transverse score lines onto the top face of the tube section (FIGS. 8 and 9). During this operation, the grippers of the row 12 close to grip the tube section at the leading edge formed by the score line 3 in the lower ply of the tube section and holds the latter as it is advanced further. The pairs of grippers 13, 13', 32, 32' and the suction bores 14 release the tube section as soon as the grippers of the row 12 have closed.

When the block bottom has thus been prepared, only the seam edge strips must be joined by a seam weld. This is accomplished by the bottom-welding cylinder 40, which rolls on the feeding drum and rotates at the same peripheral velocity as the latter and is operatively coupled thereto. The bottom-welding cylinder is provided with welding clamps 41, which have the same spacing as the tool groups on the feeding drum, and is also provided with retaining clamps 42, which precede respective welding clamps 41 in the direction of rotation and grip the bags at the leading edge 3 of the bottom when the bags have been released by the grippers 12. The welding clamp is controlled by two stationary cams 43 and 44 and is closed by the force of the spring 45. The retaining clamp is opened by spring force and closed by a stationary cam 46. The sides of the cams 43, 44 and 46 are arranged so that the welding clamp and the retaining clamp 42 close as they move past the point of contact between the welding cylinder and the feeding drum 10. The cams 43 and 44 for controlling the welding clamp open the latter after about one-fourth to one-third of a revolution when the welding operation has been completed. The welding clamps comprise known welding tapes, which are pulse-heated by electric current to the welding temperature. For this purpose, the welding cylinder is provided with electric conductors and means are provided for supplying electric current to the welding jaws and for reliably interrupting said supply at any desired points of the periphery.

As the incomplete block bottom is transferred from the feeding drum 10 to the welding cylinder 40, the unwelded edge strips 7 protruding from the bottom seam are introduced into the welding clamp, which is then closed. At the same time, the retaining clamp 12 of the feeding drum 10 is opened and the retaining clamp 42 of the welding cylinder is closed. As the bag is advanced on the welding cylinder, the bottom seam edge strips protruding from the bottom seam are joined. The finished bag is then transferred to the delivery cylinder 50, which deposits the bags on the delivery table 55.

What is claimed is:

1. A process of forming block bottom bags from heat-sealable material including the steps of:
providing a segment of heat-sealable gusseted tubular material;
supporting said segment on a surface to define top and bottom segment faces;

forming short seam welds on one end of said segment by welding said top and bottom segment faces together for a distance approximately equal to the width of said gussets while maintaining an air flow passage between said top and bottom faces extending between said gussets;

forming a pair of transverse score lines on said segment extending across the width thereof spaced apart and from the bottom of said bag;

holding the segment onto said support by engaging said segment along said score lines;

separating the top and bottom walls extending between said short seamed end and the score line remote from said seamed end;

backfolding said separated top and bottom walls;

flattening said backfolded walls whereby the flat bottom of said bag is formed; and completing the seam between said short seams by welding the top and bottom segment faces extending between said gussets.

2. Apparatus for manufacturing block bottom bags, which comprises means for continuously feeding a plastics material tubing and for severing individual tube sections, means for forming the tube sections with transverse score lines which are spaced from the leading opening edge by one half of the bottom width and by the bottom width, respectively, a continuously rotating tool carrier, which receives and advances the tube sections while they travel in their longitudinal direction and which carries tool groups which are spaced regular distances apart, which are at least as large as the length of the longest tube section to be processed, each of said groups comprising the following tools: a welding tool for forming the incomplete transverse seam weld at the leading opening of the tube section, a row of grippers, which extends transversely to the direction of travel and is spaced behind the welding tool by one-half of the bottom width, a pair of lateral grippers for gripping the longitudinal edges of the tube section on a line which is spaced by the bottom width behind the welding tool, and a number of suction bores, which become effective in the region between the row of grippers which is parallel to the axis and the pair of lateral grippers, said apparatus further comprising a suction segment, which revolves in rolling contact with the tool carrier at the same peripheral velocity as the tool carrier and is operatively connected to the tool carrier to cooperate with the suction bores formed in the tool carrier, characterized in that the apparatus is provided with a welding device, which revolves at the same peripheral velocity as the tool carrier and receives and forwards the workpieces as they travel in their longitudinal direction, said welding device comprises at least one welding clamp, which is adapted to be opened and closed during each revolution, and the welding device is operatively connected to the tool carrier in such a manner that a welding clamp closed and moves past the point of contact between the tool carrier and the welding device as bottom seam edge strips protruding at right angles move past said point of contact.

* * * * *